(12) United States Patent
Nagata et al.

(10) Patent No.: US 6,653,819 B2
(45) Date of Patent: Nov. 25, 2003

(54) REFRESH CHARGE CONTROL DEVICE AND METHOD

(75) Inventors: Shuuichi Nagata, Toyota (JP); Yoshinori Okazaki, Toyota (JP); Kousuke Suzui, Aichi-gun (JP); Hidenori Yokoyama, Toyata (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 10/128,225

(22) Filed: Apr. 24, 2002

(65) Prior Publication Data

US 2002/0167296 A1 Nov. 14, 2002

(30) Foreign Application Priority Data

May 11, 2001 (JP) ........................................ 2001-141507
Mar. 5, 2002 (JP) ........................................ 2002-059062

(51) Int. Cl.⁷ .................................................. H02J 7/00
(52) U.S. Cl. .......................... 320/133; 320/132; 320/130
(58) Field of Search ............................... 320/130, 131, 320/132, 133, 149

(56) References Cited

U.S. PATENT DOCUMENTS

| | | | | |
|---|---|---|---|---|
| 5,307,001 A | * | 4/1994 | Heavey | 320/125 |
| 5,705,910 A | * | 1/1998 | Kito et al. | 320/132 |
| 5,942,878 A | * | 8/1999 | Ito | 320/131 |
| 6,011,380 A | * | 1/2000 | Paryani et al. | 320/132 |
| 6,225,808 B1 | * | 5/2001 | Varghese et al. | 324/426 |
| 6,545,449 B2 | * | 4/2003 | Ueda et al. | 320/132 |
| 6,577,104 B2 | * | 6/2003 | Sakakibara | 320/132 |
| 6,583,606 B2 | * | 6/2003 | Koike et al. | 320/149 |

FOREIGN PATENT DOCUMENTS

JP A 2000-258513 9/2000

\* cited by examiner

Primary Examiner—Bao Q. Vu
(74) Attorney, Agent, or Firm—Oliff & Berridge, PLC

(57) ABSTRACT

A refresh charge control device which counts a time after achieving a fully charged condition of a battery by last refresh charge and an accumulative value of a charge and discharge electric current. Plural relationship between the time and the accumulative value is determined as conditions for carrying out the refresh charge of the battery. When either one of those relationship is established, the refresh charge of the battery is performed for fully charging the battery. It is judged whether a condition that a vehicle speed is equal to or faster than a predetermined vehicle speed continues for a predetermined time. Even the condition that the vehicle speed is equal to or faster than the predetermined vehicle speed continues for the predetermined time, the refresh charge of the battery is performed for fully charging the battery irrespective of the relationship between the time and the accumulative value.

24 Claims, 6 Drawing Sheets

REFRESH CHARGE CONTROL DEVICE AND METHOD

INCORPORATION BY REFERENCE

The disclosures of Japanese Patent Application Nos. 2001-141507 filed on May 11, 2001 and 2002-59062 filed on Mar. 5, 2002, including the specifications, drawings and abstracts are incorporated herein by reference in their entirety.

BACKGROUND OF THE INVENTION

1. Field of Invention

This invention generally relates to a refresh charge control device and method. More particularly, the present invention pertains to a refresh charge control device and method for performing a refresh charge of a battery.

2. Description of Related Art

In general, when a battery is continually used under a half-charged condition which does not reach a fully charged condition, an internal material of the battery is solidified. When the internal material of the battery is solidified, the absolute capacity of the battery is reduced, and thus the duration of battery life is declined. There has been disclosed a method for regularly refreshing the battery to be the fully charged condition for preventing the decline of the duration of battery life. By regularly refreshing the battery to be the fully charged condition, the solidification of the internal material is restrained. In this manner, the battery life is ensured over the long term.

According to a system including a battery on vehicle, a period of the decline of the battery life is different depending on the individual users because the frequency for using the vehicle is different depending on the users. Despite the foregoing condition, in case the refresh charge of the battery is performed by a constant cycle (e.g., once a month) or every time the vehicle is used without considering the frequency of use by the user, the battery may be always maintained to be the fully charged condition depending on the usage by the user. In this case, the regeneration energy of the vehicle cannot be recovered to the battery, thus the mileage cannot be improved.

SUMMARY OF THE INVENTION

It is an object of the present invention to provide a refresh charge control device and method for performing a refresh charge of a battery at the appropriate period.

According to a first aspect of the present invention, the refresh charge control device includes a time count device that counts the time after achieving last fully charged condition of the battery, an accumulative electric use amount count device that counts the accumulative electric use amount of the battery after achieving the last fully charged condition of the battery, and a controller that starts the refresh charge of the battery when the time counted by the time count device and the accumulative electric use amount counted by the accumulative electric usage count satisfy a predetermined relationship.

According to the first aspect of the present invention, the refresh charge of the battery is performed when the predetermined relationship is satisfied between the time after achieving the last fully charged condition and the accumulative electric use amount after achieving the last fully charged condition of the battery. In case the time after achieving the last fully charged condition of the battery is long, it is appropriate to perform the refresh charge in order to prevent the decline of the battery life even if the accumulative electric usage of the battery is small. In case the accumulative electric usage of the battery is large even if the time after achieving the last fully charged condition of the battery is relatively short, it is appropriate to perform the refresh charge because the battery is frequently used under the half-charged condition. Thus, according to the first aspect of the present invention, when the predetermined relationship is appropriately determined, the refresh charge in accordance with the usage of the battery is performed. Accordingly, the refresh charge of the battery is performed at the appropriate period.

According to the first aspect of the present invention, the controller may start the refresh charge of the battery when the time counted by the time count device is equal to or greater than a first time and the accumulative electric use amount counted by the accumulative electric use amount is equal to or greater than a first use amount.

Further, according to the first aspect of the present invention, the controller may start the refresh charge of the battery when the time counted by the time count device is equal to or longer than a second time which is longer than the first time and the accumulative electric use amount counted by the accumulative electric use amount device is equal to or greater than a second use amount which is less than the first use amount.

According to a second aspect of the present invention, a refresh charge control device for performing the refresh charge of the battery installed on the vehicle by using a power source is provided. The refresh charge control device includes a high-speed travel judging device that judges whether the vehicle travels equal to or faster than a predetermined speed and a controller that performs the refresh charge of the battery when it is judged that the vehicle is traveling equal to or faster than the predetermined speed by the high-speed travel judging device.

According to the second aspect of the present invention, the refresh charge of the battery is performed when the vehicle is traveling equal to or faster than the predetermined speed. Because the power source of the vehicle is efficiently operated when the vehicle travels equal to or faster than the predetermined speed, the fuel efficiency of the vehicle is not significantly declined even if the battery is charged using the power source. Thus, according to the present invention, the refresh charge of the battery is performed at the appropriate period during which the mileage of the vehicle is not significantly declined.

When the condition that the vehicle travels equal to or faster than the predetermined speed continues over the long term, it is judged that the vehicle is traveling on a road such as expressway on which the high-speed traveling is achievable. Thus, in this case, the regenerative braking is hard to be performed, the generation of the regeneration energy amount is relatively small, and the opportunity for charging the battery is few.

Accordingly, according to the second aspect of the present invention, when the refresh charge control device includes a time judging device that judges whether the condition that the vehicle travels equal to or faster than the predetermined speed continues by the high-speed travel judging device and the controller starts the refresh charge of the battery when it is judged that the condition that the vehicle travels equal to or faster than the predetermined speed continues for the predetermined time by the time judging device, the refresh charge is performed under the condition that a normal charge of the battery is hard to be performed. Thus, the generation of the unnecessary energy which cannot be recovered at the refresh charge can be prevented.

When the refresh charge is frequently repeated regardless of the situation that the battery is not frequently used, the battery is deteriorated to decline the duration of battery life.

According to the second aspect of the present invention, when the refresh charge control device includes an accumulative electric use amount judging device that judges whether the accumulative electric use amount of the battery after achieving the last fully charged condition of the battery is equal to or greater than a predetermined amount and when the controller starts the refresh charge of the battery when it is judged that the accumulative electric use amount is equal to or greater than the predetermined amount by the accumulative electric use amount judging device, the deterioration of the battery is restrained.

According to the second aspect of the present invention, when the refresh charge control device includes a time count device that counts a time after achieving the last fully charged condition and an accumulative electric use amount count device that counts the accumulative electric use amount of the battery after achieving the last fully charged condition of the battery and when the controller starts the refresh charge of the battery when the time counted by the time count device and the accumulative electric use amount counted by the accumulative electric use amount count device satisfy a predetermined relationship, the refresh charge of the battery can be performed at an appropriate period in accordance with the usage of the battery without significantly deteriorating the mileage of the vehicle.

According to the construction in which the refresh charge of the battery is performed when the vehicle travels equal to or faster than a predetermined speed, provided that the refresh charge is cancelled immediately after the decline of the vehicle speed slower than the predetermined speed, the time for charging is not ensured and is hard to complete the refresh charge.

Thus, according to the second aspect of the present invention, by determining the controller to continue the refresh charge until establishing a predetermined condition even when the vehicle is not to be judged to travel equal to or faster than the predetermined vehicle speed by the high-speed travel judging device after starting the refresh charge of the battery, the completion of the refresh becomes easier to be achieved.

In this case, according to the second aspect of the present invention, the predetermined condition may include a discharge demand of the battery.

According to the second aspect of the present invention, by determining the predetermined condition is that the vehicle travels equal to or less than a vehicle speed which is equal to or slower than the predetermined vehicle speed by a predetermined value, the completion of the refresh charge is easier to be achieved while restraining the decline of the mileage of the vehicle to a minimum.

Because the discharge cannot be performed during the process that the refresh charge of the batter is performed, the operation of the electric load cannot be ensured when the refresh charge is continued regardless of the discharge demand of the battery for operating the electric load.

Accordingly, in each aspect of the present invention, by determining that the controller interrupts the refresh charge when the discharge demand is performed after starting the refresh charge of the battery and restarts the refresh charge when the discharge demand is released, the battery can be appropriately discharged even after the start of the refresh charge, and thus the operation of the electric load can be ensured.

In this case, according to each aspect of the present invention, when the refresh charge control device includes a charge accumulative time judging device that judges whether the accumulative time performing the refresh charge after starting the refresh charge of the battery is equal to or longer than a predetermined time and when the controller judges that the accumulative time is equal to or longer than the predetermined time by the accumulative time judging device after starting the refresh charge of the battery, the refresh charge may be completed.

Provided that the refresh charge of the battery is performed with a charge voltage the same with the case of the normal charge by the regenerative braking, the charging time for achieving the fully charged condition is elongated, and the effect of the refresh charge cannot be ensured promptly. On the other hand, because the frequency of the execution of the refresh charge is fewer than the frequency of the execution of the normal charge, the deterioration of the battery due to the overcharge is hard to be generated even when the battery is charged by impressing the high voltage for performing the refresh charge.

Accordingly, in each aspect of the present invention, when the refresh charge control device includes a charge voltage change device that changes the charge voltage when performing the refresh charge of the battery compared to the charge voltage when performing the normal charge, the charge voltage at the refresh charge is determined to be higher than the charge voltage at the normal charge. Thus, the deterioration of the battery due to the charging of the battery can be restrained to be the minimum and the effect of the refresh charge can be ensured in short time.

The lower the temperature is, the harder charging the battery and the higher the temperature is, the easier charging the battery. Accordingly, in each aspect of the present invention, by determining that the charge voltage change device changes the charge voltage at the refresh charge of the battery in accordance with the temperature of the battery, the effect of the refresh charge can be always achieved in short time without being influenced by the temperature of the battery.

According to each aspect of the present invention, by including a battery temperature judging device that judges whether the temperature of the battery is equal to or lower than a predetermined temperature and a battery warm-up device that warms up the battery before the start of the refresh charge when it is judged that the battery temperature is equal to or lower than the predetermined temperature by the battery temperature judging device, the refresh charge is performed effectively because the refresh charge is performed after the battery is warmed up.

In this case, according to each aspect of the present invention, the battery warm-up device may warm up the battery by operating a heating device that warms up the battery or by repeating the charge and discharge of the battery.

BRIEF DESCRIPTION OF THE DRAWINGS

The foregoing and additional features and characteristics of the present invention will become more apparent from the following detailed description considered with reference to the accompanying drawing figure in which like reference numerals designate like elements.

DETAILED DESCRIPTION OF PREFERRED EMBODIMENTS

Figure 1:
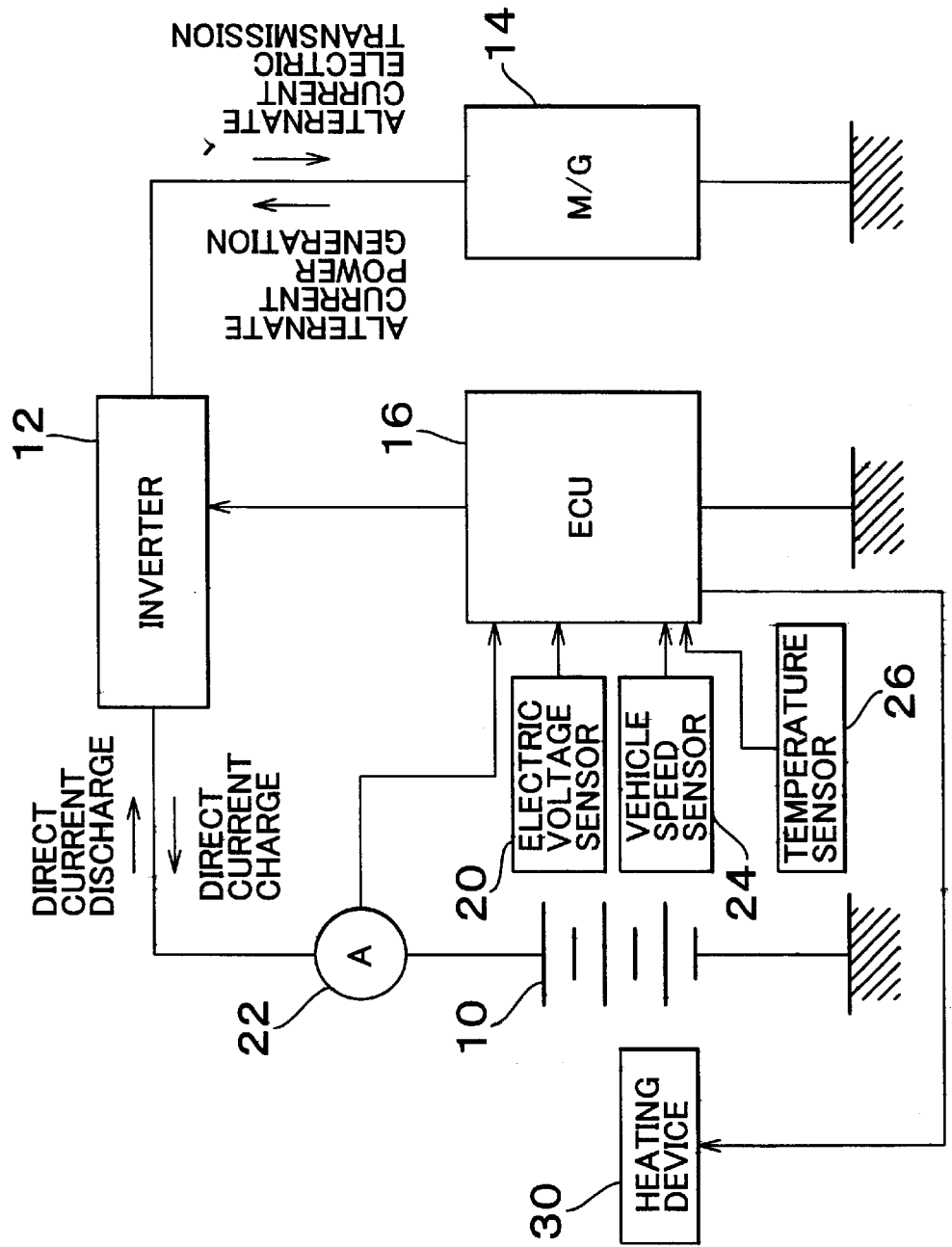
FIG. 1 is a construction view of a system for judging a fully charged condition of a battery according to a first embodiment of the present invention.

Referring to FIGS. 1–6, embodiments of a refresh charge control device of the present invention will be explained as follows. FIG. 1 shows a construction view of a system including a refresh charge control device of a first embodiment of the present invention. As shown in FIG. 1, the system of this embodiment includes a battery 10 functioning as a power source for vehicle. The battery 10 includes plural battery cells, which are connected in series, and corresponds to, for example, a lead-acid battery having an output voltage about 36V. The battery 10 is connected to a motor/generator (i.e., hereinafter referred as M/G) 14 via an inverter 12. The inverter 12 has a power transistor for motor built-in and converts the direct current electric power of the battery 10 to the alternate current electric power of the M/G 14. The M/G 14 is actuated by the electric power supplied from the battery 10 when the power transistor for motor of the inverter 12 is ON for generating a predetermined torque for rotating wheels. That is, the battery 10 supplies the electric power to the M/G 14 when the power transistor for motor of the inverter 12 is ON.

The M/G 14 converts the kinetic energy of the vehicle to the electric energy at the regenerative braking of the vehicle and also functions as a generator for converting the motivity of the vehicle engine to the electric energy at a refresh charge of the battery 10. The inverter 12 has a power transistor for generator built-in and converts the alternate current electric power generated in the M/G 14 to the direct current electric power of the battery 10 in accordance with a switching operation of the power transistor for generator. That is, the battery 10 receives the supply of the electric power by the power generation of the M/G 14 by the regeneration braking or engine motivity to be charged under the condition that the power transistor for generator of the inverter 12 is ON.

The inverter 12 is connected to an electronic control unit (i.e., hereinafter referred as ECU) 16 constructed with a microcomputer. The ECU 16 supplies a command signal to the power transistor for motor of the inverter 12 so that the battery 10 is to be discharged when it is judged that the electric power supply is required from the battery 10 to the M/G 14. When it is judged that the electric power supply from the M/G 14 to the battery 10 is required, the ECU 16 supplies the command signal to the power transistor for generator so that the battery 10 is to be charged.

The ECU 16 is connected to an electric voltage sensor 20 provided between positive and negative terminals of the battery 10. The electric voltage sensor 20 outputs the signal in accordance with the electric voltage between the terminals of the battery 10 (i.e., hereinafter referred as battery voltage V). The output signal of the electric voltage sensor 20 is supplied to the ECU 16. The ECU 16 detects the battery voltage V of the battery 10 based on the output signal of the electric voltage sensor 20.

The ECU 16 is connected to an electric current sensor 22 provided between the battery 10 and the inverter 12. The electric current sensor 22 outputs the signal in accordance with a charge and discharge electric current (i.e., hereinafter referred as battery electric current I) flowed from between the battery 10 and the inverter 14. The output signal of the electric current sensor 22 is supplied to the ECU 16. The ECU 16 detects the battery electric current I flowed in the battery 10 based on the output signal of the electric current sensor 22.

There is a correlation between an open circuit voltage between the terminals of the battery 10 and the fully charged condition of the battery 10. Thus, the ECU 16 judges the charging state of the battery 10 (hereinafter referred as battery capacity SOC) based on the battery voltage V detected using the electric voltage sensor 20 at unloaded condition. Then, the battery capacity SOC is recognized based on an addition-subtraction value of the battery electric current I detected using the electric current sensor 22 by referring to the judged battery capacity SOC. The ECU 16 actuates the inverter 12 following the charge and discharge demand of the battery 10 for maintaining the battery capacity SOC of the battery 10 to be a desired capacity (e.g., 75%; hereinafter, referred as a target capacity) at normal condition.

The ECU 16 is connected to a vehicle speed sensor 24. The vehicle speed sensor 24 outputs the signal in accordance with the vehicle speed (i.e., hereinafter referred as vehicle speed SPD). The output signal of the vehicle sensor 24 is supplied to the ECU 16. The ECU 16 detects the vehicle speed SPD based on the output signal of the vehicle speed sensor 24.

The ECU 16 is connected to a temperature sensor 26 provided in or around the battery 10. The temperature sensor 26 outputs the signal in accordance with the temperature of the battery 10 (i.e., hereinafter referred as battery temperature TH). The output signal of the temperature 26 is supplied to the ECU 16. The ECU 16 detects the battery temperature TH of the battery 10 based on the output signal of the temperature sensor 26.

The ECU 16 is further connected to a heating device 30. The heating device 30 includes a function for warming-up the battery 10 using the electric power generated by the M/G 14 following the command from the ECU 16. The ECU 16 supplies the command signal to the heating device 30 when it is required to warm up the battery 10 to heat the heating device 30.

Figure 2:
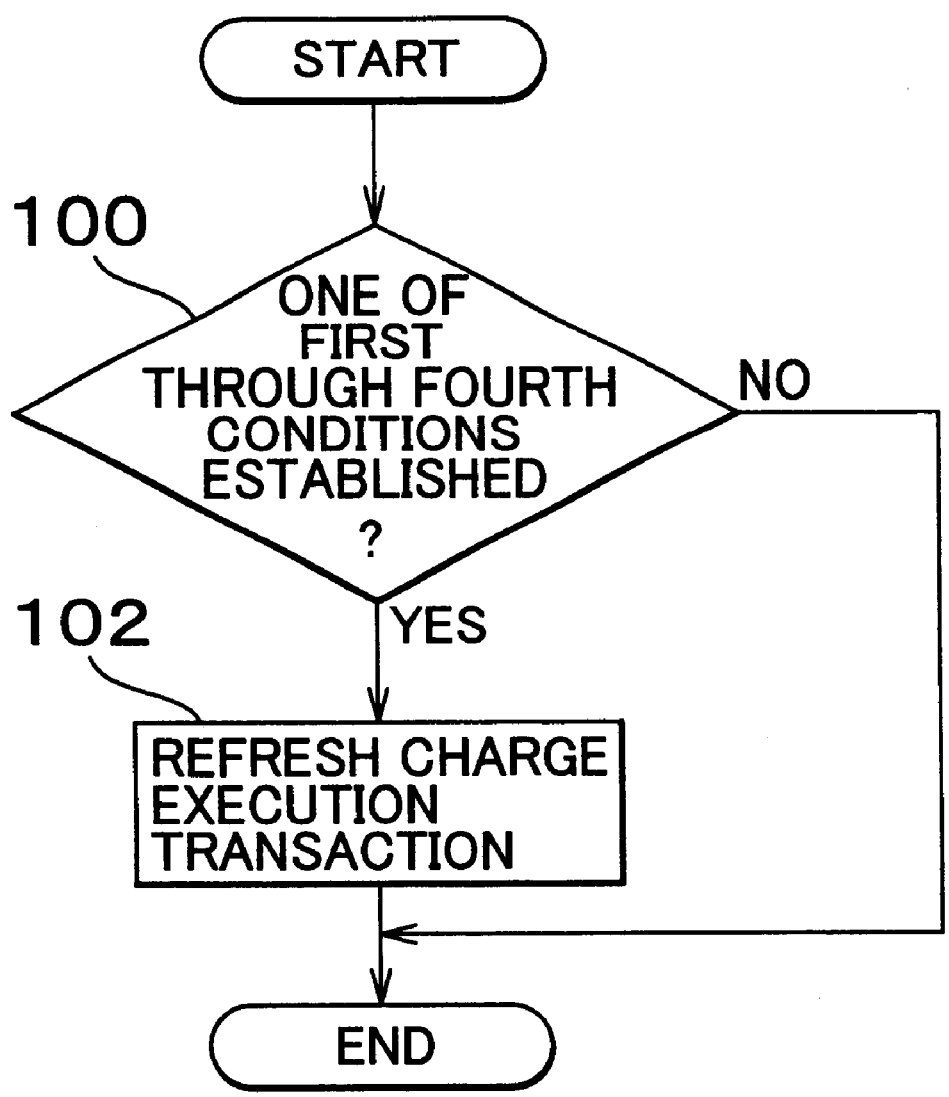
FIG. 2 is a flowchart of a control routine carried out for performing a refresh charge of the battery according to the first embodiment of the present invention.

When the condition to use the battery 10 with half-charged condition, which does not reach the fully charged condition, is repeated, the internal material of the battery may be solidified. When the solidification of the internal material of the battery is generated, the absolute capacity of the battery 10 is reduced, and thus the duration of battery life 10 is declined. Thus, in order to ensure the life of the battery 10 for the long term, it is required to prevent the solidification of the internal material. As a method for preventing the solidification of the internal material, it is effective to refresh the battery 10 to be the fully charged condition (i.e., hereinafter referred as refresh charge). The system of this embodiment starts and carries out the refresh charge of the battery 10 when one of first through fourth conditions as shown below is established. Referring to FIG. 2, the conditions for performing the refresh charge of the battery 10 of this embodiment will be explained as follows.

The solidification of the internal material of the battery 10 is generated by repeatedly using the battery 10 under the half-charged condition, which does not reach the fully charged condition as explained above. It can be judged that the battery 10 is repeatedly used without reaching the fully charged condition when accumulative value of the charge and discharge electric current of the battery 10 becomes large to some extent after achieving the last fully charged condition. Thus, it is appropriate to perform the refresh charge of the battery 10 when the accumulative value of the charge and discharge electric current flowed in the battery 10 is increased to some extent after achieving the fully charged condition by the last refresh charge.

On the other hand, when the excessively long time has passed after achieving the fully charged condition of the battery 10, the internal material of the battery 10 may be solidified even if the accumulative value of the charge and discharge electric current of the battery 10 is not so large. Thus, it is appropriate to perform the refresh charge of the battery 10 when the long time after achieving the fully charged condition of the battery 10 by the last refresh charge has passed.

Accordingly, a first condition for performing the refresh charge of the battery 10 of the system of this embodiment is as follows. The relationship between a time $T_1$ after achieving the fully charged condition by the last refresh charge and an accumulative value $\Sigma|I|$ of the battery electric current I flowed in the battery 10 is determined as plural conditions shown in (i)~(iv). And it is judged whether either one of relationship (i)~(iv) is established. When either one of relationship is established, the refresh charge of the battery 10 is performed. With this construction, the refresh charge of the battery 10 can be performed at the appropriate period before generating the solidification of the internal material in accordance with the usage of the battery 10.

(i) $\Sigma|I| \geq I_1$ (e.g., $I_1$=6,000,000 Asec)

(ii) $T_1 \geq T_M$ (e.g., $T_M$=1 month) and $\Sigma|I| \geq I_1-\alpha$ (i.e., $\alpha$ corresponds to a positive number smaller than $I_1$, which is, for example, determined to be 2,000,000 Asec)

(iii) $T_1 \geq T_M+1$ and $\Sigma|I| \geq I_1-\alpha-\beta$ (i.e., $\beta$ corresponds to a positive number smaller than $I_1-\alpha$, which is determined, for example, to be 1,000,000 Asec)

(iv) $T_1 \geq T_M+2$

According to this embodiment of the present invention, it is required to operate the M/G 14 for generating the electric power by actuating the vehicle engine for performing the refresh charge of the battery 10. Thus, when the refresh charge of the battery 10 is performed during the low speed travel of the vehicle in which the fuel efficiency of the vehicle is low, the mileage is deteriorated. Accordingly, it is appropriate to perform the refresh charge of the battery 10 when the vehicle continues high-speed travel in which the influence to the fuel efficiency is small.

Provided that the refresh charge of the battery 10 is performed at every high-speed traveling, the refresh charge is liable to be repeated even under the condition that the battery 10 is not frequently used. In this case, the deterioration of the battery is progressed to decline the battery life. Accordingly, although it is desirable to perform the refresh charge of the battery 10 during the high-speed traveling in terms of the fuel efficiency, performing the refresh charge at every high-speed traveling is not reasonable in terms of the deterioration of the battery 10.

Accordingly, a second condition for performing the refresh charge of the battery 10 of the system of this embodiment is as follows. That is, the accumulative value $\Sigma|I|$ of the charge and discharge electric current I after achieving the fully charged condition by the last refresh charge and the vehicle speed SPD are determined as shown in (v). And it is judged whether the accumulative value $\Sigma|I|$ of the charge and discharge electric current I is equal to or greater than a predetermined value $I_2$ (e.g., 200,000 Asec) and the condition that the vehicle is traveling equal to or faster than a predetermined vehicle speed SPD0 (e.g., 60 km/h) continues longer than a predetermined time $T_{SH}$ (e.g., 3 minutes). The refresh charge of the battery 10 is performed by increasing the driving amount of the engine when the second condition is established. With this construction, the refresh charge of the battery 10 can be performed during the appropriate period in which the mileage of the vehicle is not significantly declined.

(v) $T(SPD \geq SPD0) \geq T_{SH}$ and $\Sigma|I| \geq I_2$

It is judged that the battery capacity SOC is significantly declined when the battery voltage V of the battery 10 is significantly declined from a desired value during the normal use. In this case, the possibility for causing the running out of the battery is high. In order to obviate these drawbacks, it is appropriate to once refresh the battery 10 to the fully charged condition.

Accordingly, a third condition for performing the refresh charge of the battery 10 of the system of this embodiment is to judge whether the battery voltage V is lower than a desired value at the start of the engine. When the battery voltage V is lower than the desired value, the refresh charge of the battery 10 is performed. With this construction, because the battery 10 is forced to be refreshed to be the fully charged condition when the battery voltage V becomes small, the generation of the running out of the battery can be securely prevented.

Further, it is preferable to control the battery capacity SOC to a target capacity for performing well-balanced charge and discharge of the battery 10. Notwithstanding, when the battery capacity SOC is significantly small relative to the target capacity to the extent which is not normally generated, the possibility for causing the running out of the battery is high. In order to avoid the running out of the battery, it is appropriate to once refresh the battery 10 to achieve the fully charged condition.

Accordingly a fourth condition for performing the refresh charge of the battery 10 of the system of this embodiment, it is judged whether the battery capacity SOC is lower than the desired target capacity by equal to o greater than a predetermined value (e.g., 20%). When the battery capacity SOC is equal to or less than a value subtracting 20 from the target capacity (i.e., battery capacity SOC≦(target capacity −20)), the refresh charge of the battery 10 is performed. With this construction, because the battery 10 is forced to be refreshed to be the fully charged condition when the battery capacity SOC which is not generated under the normal condition is generated, the running out of the battery can be securely prevented.

FIG. 2 shows a flowchart of a control routine carried out by the ECU 16 for performing the refresh charge of the battery 10 according to this embodiment of the present invention. The routine shown in FIG. 2 is repeatedly activated every time the transaction ends. When the routine shown in FIG. 2 is activated, the transaction of Step 100 is carried out.

In Step 100, it is judged whether one of first through fourth conditions is established. When the negative judgment is performed, that is, when it is judged that none of first through fourth conditions is established, the current routine ends without proceeding any transaction. On the other hand, when the positive judgment is performed, that is, when at least one of first through fourth conditions is established, the transaction of Step 102 is carried out.

In Step 102, the transaction for performing the refresh charge of the battery 10 is carried out. In practice, the M/G 14 is operated as generator by increasing the engine output to achieve the fully charged condition of the battery 10, and the transaction for supplying the charge electric current from the M/G 14 to the battery 10 is carried out by properly actuating the inverter 12. When the transaction of Step 102 is carried out, the refresh charge of the battery 10 is performed for fully charging the battery 10. When the transaction of Step 102 ends, the current routine ends.

According to the routine shown in FIG. 2, when one of the first though fourth conditions is established, the refresh charge of the battery 10 can be started to be carried out. In practice, the refresh charge can be preformed when the time $T_1$ after achieving the fully charged condition by the last refresh charge and the accumulative value $\Sigma|I|$ of the battery electric current I have a predetermined relationship. With this construction, when the use of the battery 10 under the half-charged condition after achieving the fully charged condition of the battery 10 by the last refresh charge or when the predetermined time has passed after achieving the fully charged condition even when the use of the battery 10 under the half-charged condition is not continued, the refresh charge is performed. Thus, the solidification of the internal material of the battery 10 can be securely prevented by responding to the usage condition of the battery 10 after achieving the fully charged condition. According to the refresh charge control device of this embodiment, the refresh charge of the battery 10 can be performed at the appropriate period before causing the solidification of the internal material of the battery 10.

In addition, the refresh charge can be started to be carried out when accumulative value $\Sigma|I|$ of the battery electric current I after achieving the fully charged condition by the last refresh charge is equal to or greater than the predetermined value $I_2$ and the condition that the vehicle travels equal to or faster than the predetermined vehicle speed SPD0 is continued for the predetermined time $T_{SH}$. With this construction, because the engine output is increased for performing the refresh charge of the battery 10 during the high-speed traveling in which the engine is operated efficiently, the influence to the mileage is restrained to be small. Thus, according to the refresh charge control device of this embodiment, the refresh charge of the battery 10 can be performed at appropriate period with good mileage efficiency, that is, without declining the vehicle mileage significantly.

Because the frequency of the braking is low and the regeneration energy amount generated by the regeneration braking is small during the high-speed traveling of the vehicle, the energy, which is not recovered, is not increased in the battery 10 even if the refresh charge is performed for fully charging the battery 10. Thus, because the refresh charge is performed under the condition that the normal charge by the regenerative braking of the battery 10 is hard to be performed according to this embodiment, the generation of the unnecessary energy, which cannot be recovered during the refresh, charge can be prevented. That is, according to the refresh charge control device of this embodiment, the refresh charge of the battery can be preformed at the appropriate period during which the unnecessary energy, which is not recovered, is not generated.

According to this embodiment, even when the vehicle travels at high speed, the refresh charge is not performed unless the use of the battery 10 under the half-charged condition is repeatedly continued after achieving the fully charged condition of the battery 10 by the last refresh charge. Thus, the progress of the deterioration of the battery 10 due to the frequent performance of the refresh charge is prevented to prevent the decline of the battery life of the battery 10. Accordingly, the refresh charge can be performed at the appropriate period while preventing the deterioration of the battery 10 in this embodiment.

As described above, the capacity SOC of the battery 10 is judged based on the accumulative value of the battery electric current I based on the output signal of the electric sensor 22 in this embodiment. Notwithstanding, when the battery 10 is continuously used, the deviance between the accumulative value of the battery electric current I by the electric current sensor 22 and the actual accumulative value of the electric current may be increased and the battery capacity SOC may be misjudged. In this embodiment, after the battery 10 is continuously used to some extent under the half-charged condition after the battery 10 is fully charged by the last refresh charge, the refresh charge is performed. Thus, by charging the battery capacity SOC to be 100% and by resetting the accumulative value of the battery electric current I by the electric current sensor 22 when the refresh charge is completed, the expansion of the deviance of the battery capacity SOC by the electric sensor 22 can be prevented.

Further, in this embodiment, the refresh charge of the battery 10 can be started to be carried out when the value of the battery voltage V is below the desired value and when the battery capacity SOC becomes below the desired target capacity by equal to or greater than the predetermined value. With this construction, because the refresh charge of the battery 10 is performed before generating the running out of the battery, the running out is securely prevented. Thus, according to this embodiment, the refresh charge of the battery 10 can be performed at the appropriate period during which the running out of the battery is not caused.

It is desirable to perform the refresh charge of the battery 10 during the high-speed traveling during which the fuel efficiency of the engine is effective as described above and it is not desirable to perform the refresh charge of the battery 10 during the low speed traveling of the vehicle during which the fuel efficiency is low. That is, in case the vehicle speed SPD becomes below the predetermined vehicle speed SPD0 which is the starting condition of the refresh charge after starting the refresh charge of the battery 10, it is appropriate not to perform the refresh charge considering the fuel efficiency of the engine. Notwithstanding, provided that the execution condition of the refresh charge is equal to or greater than a threshold value (i.e., predetermined vehicle speed SPD), that is, provided that the refresh charge is cancelled when the vehicle speed SPD becomes below the predetermined vehicle speed SPD0, the opportunity for sufficiently ensuring the charging time for the refresh charge is reduced. Thus, with this construction, the battery 10 cannot achieve the fully charged condition by the refresh charge. That is, the possibility not to be able to complete the refresh charge is increased, thus, it becomes difficult to ensure the effect of the refresh charge.

Accordingly, in the system of this embodiment, after starting the refresh charge of the battery 10 by the establishment of the condition (v) (i.e., the second condition) when the vehicle speed SPD becomes equal to or greater than the predetermined vehicle speed SPD0, the refresh charge is continued even when the vehicle speed SPD becomes below the predetermined vehicle speed SPD0. With this construction, compared to the construction in which the refresh charge is performed only when the vehicle speed SPD is equal to or greater than the predetermined vehicle speed SPD0, the charging time is easier to be ensured after starting the refresh charge, thus the completion of the refresh charge can be performed easier.

Figure 3:
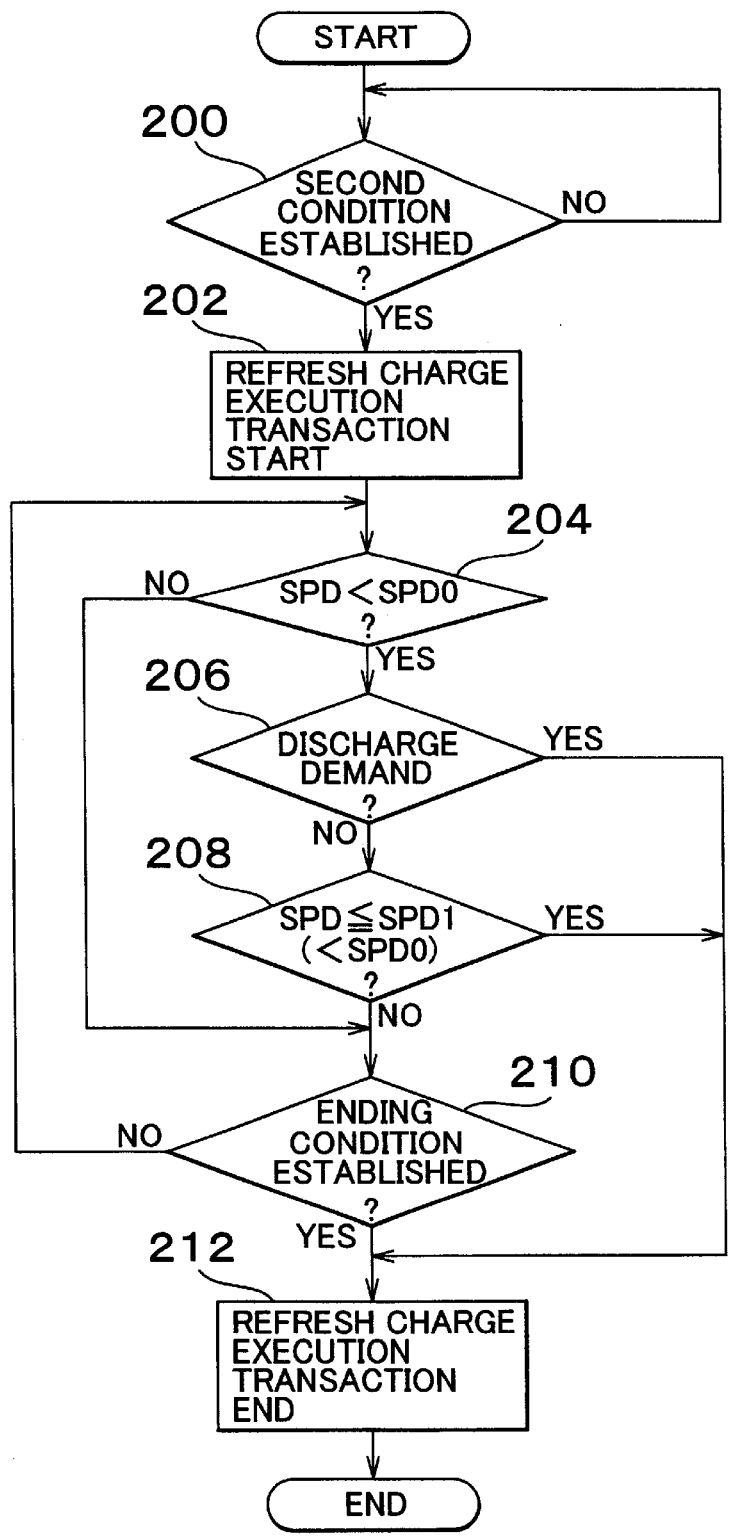
FIG. 3 is a flowchart of a control routine carried out for controlling an execution and end of the refresh charge of the battery according to the first embodiment of the present invention.

FIG. 3 shows a flowchart of a control routine carried out after the ECU 16 establishes the starting condition of the refresh charge (i.e., foregoing first through fourth conditions) for controlling the execution and end of the refresh charge of the battery 10. The routine shown in FIG. 3 is activated repeatedly every time the transaction ends. When the routine shown in FIG. 3 is activated, the transaction of Step 200 is carried out.

In Step 200, it is judged whether the aforementioned second condition is established. In practice, it is judged whether the accumulative value $\Sigma|I|$ of the charge and discharge electric current I is equal to or greater than the predetermined value $I_2$ and whether the condition that the vehicle is traveling equal to or faster than the predetermined vehicle speed SPD0 is continued for the predetermined time $T_{SH}$. The transaction of Step 200 is carried out repeatedly until the positive judgment is performed. When the positive judgment is performed, the transaction of Step 202 is carried out.

In Step 202, the transaction for starting the refresh charge of the battery 10 is carried out. In practice, By increasing the engine output for fully charging the battery 10 by the refresh charge, by converting the increased portion of the engine output to the electric energy in the M/G 14, and by properly actuating the inverter 12, the transaction for starting the supply of the charging electric current from the M/G 14 to the battery 10 is carried out. When the transaction of Step 202 is carried out, the refresh charge is performed for fully charging the battery 10.

In Step 204, it is judged whether the vehicle speed SPD detected using the vehicle sensor 24 becomes less than the predetermined vehicle speed SPD0 which is the starting condition of the refresh charge. When it is established that the vehicle speed SPD is less than the predetermined vehicle speed SPD0 (i.e., SPD<SPD0) and the positive judgment is performed, the transaction of Step 206 is carried out. On the other hand, when the condition that the vehicle speed SPD is less than the predetermined vehicle speed SPD0 (i.e., SPD<SPD0) is not established, it is judged that the vehicle is traveling under the relatively high speed and the fuel efficiency is not declined even if the refresh charge is continued. Accordingly, when the negative judgment is performed, transactions of Step 206 and 208 are skipped to carry out the transaction of Step 210.

In Step 206, it is judged whether the discharge demand to the battery 10 is performed. When the discharge demand is not performed, the condition that the operation of the electric load such as the air conditioner and the light is not ensured is not generated due to the refresh charge, thus there is no disadvantage even if the refresh charge is continued. Thus, when the negative judgment is performed, the transaction of Step 208 is carried out. On the other hand, when the discharge demand is performed, it is not appropriate to continue the refresh charge because the condition that the operation of the electric load is not ensured is generated if the refresh charge is continued. Accordingly, when the positive judgment is performed, the transactions of Step 208 and Step 210 are skipped to carry out the transaction of Step 212.

In Step 208, it is judged whether the vehicle speed SPD is equal to or slower than a vehicle speed SPD1 (e.g., 40 km/h) which is slower than the predetermined vehicle speed SPD0. When it is judged that the condition that the vehicle speed is equal to or less than the vehicle speed SPD1 is not established, it is judged that the vehicle is traveling by the speed between the vehicle speed SPD1 and the predetermined vehicle speed SPD0. In this case, the transaction is advanced to Step 210. On the other hand, when it is judged that the condition that the vehicle speed is equal to or less than the vehicle speed SPD1 is established, the transaction of Step 210 is skipped to carry out the transaction of Step 212.

In Step 210, it is judged whether an ending condition of the refresh charge is established. The ending condition of the refresh charge of Step 210 includes that the battery capacity SOC becomes approximately 100%, the time after starting the refresh charge reaches the time to the extent to be judged that the battery 10 is about to be the fully charged condition, and that the discharge of the battery 10 is demanded. When it is judged that the ending condition of the refresh charge is not established, the transactions after Step 204 are repeatedly carried out. On the other hand, when it is judged that the ending condition of the refresh charge is established, the transaction of Step 212 is carried out.

In Step 212 the transaction for ending the refresh charge of the battery 10 is carried out. In practice, the transaction for stopping the supply of the charge electric current from the M/G 14 to the battery 10 is carried out by releasing the increase of the engine output and stopping the actuation of the inverter 12. After the transaction of Step 212 is carried out, the refresh charge of the battery 10 ends. When the transaction of Step 212 ends, the current routine ends.

According to the routine shown in FIG. 3, the refresh charge can be continued until the discharge demand of the battery 10 is performed or until reaching a predetermined vehicle speed even when the vehicle is slowed down to end the high-speed traveling after starting the refresh charge of the battery 10 determining the high-speed traveling as the starting condition. With this construction, the refresh charge is performed even when the vehicle speed is below the predetermined vehicle speed which corresponds to the starting condition of the refresh charge. Thus, the time for continuing the refresh charge is extended compared to the construction for immediately canceling the refresh charge when the high-speed traveling of the vehicle ends.

According to this embodiment, the charging time for the refresh charge can be easily ensured under the condition that the refresh charge is started in the high-speed traveling of the vehicle and the completion of the refresh charge is easier to achieve. Thus, according to the refresh charge control device of this embodiment, the effects of the refresh charge, that is, the effect for preventing the solidification of the internal material of the battery 10, for extending the battery life, and for improving the durability of the battery 10 are securely ensured.

In particular, with the foregoing construction, although the refresh charge is continued until the vehicle speed reaches the speed with relatively bad fuel efficiency after ending the high-speed traveling of the vehicle because the vehicle speed as the ending condition of the refresh charge is slower than the vehicle speed as the starting condition of the refresh charge, the deterioration of the mileage can be restrained to the minimum because the execution frequency of the refresh charge is not large. Thus, according to the refresh charge control device of this embodiment, the completion of the refresh charge is easier to achieve while restraining the deterioration of the mileage to the minimum. Accordingly, the effect of the refresh charge can be securely ensured while restraining the deterioration of the mileage.

Provided that the refresh charge is continued irrespective of the discharge demand of the battery 10, the discharge of the battery 10 cannot be performed and the electric load of such as air conditioner cannot be operated. On the contrary, according to the routine shown in FIG. 3, the refresh charge ends when the discharge demand is performed after starting the refresh charge of the battery 10 by determining the high-speed traveling (i.e., the second condition) as the condition for starting the refresh charge. Thus, according to the embodiment, the refresh charge is completed following the discharge demand of the battery 10 and the battery 10 can be appropriately discharged. Thus, the operation of the electric load can be securely ensured.

It is desirable to stop the refresh charge for ensuring the operation of the electric load when the discharge demand is performed under the condition that the refresh charge of the battery 10 is started by the establishment of the first, third, or fourth condition excluding the second condition. According to the system of this embodiment, the operation of the electric load can be ensured by stopping the refresh charge of the battery 10 when the discharge demand is performed after starting the refresh charge of the battery 10 by the establishment of the first, third, or the fourth condition.

Figure 4:
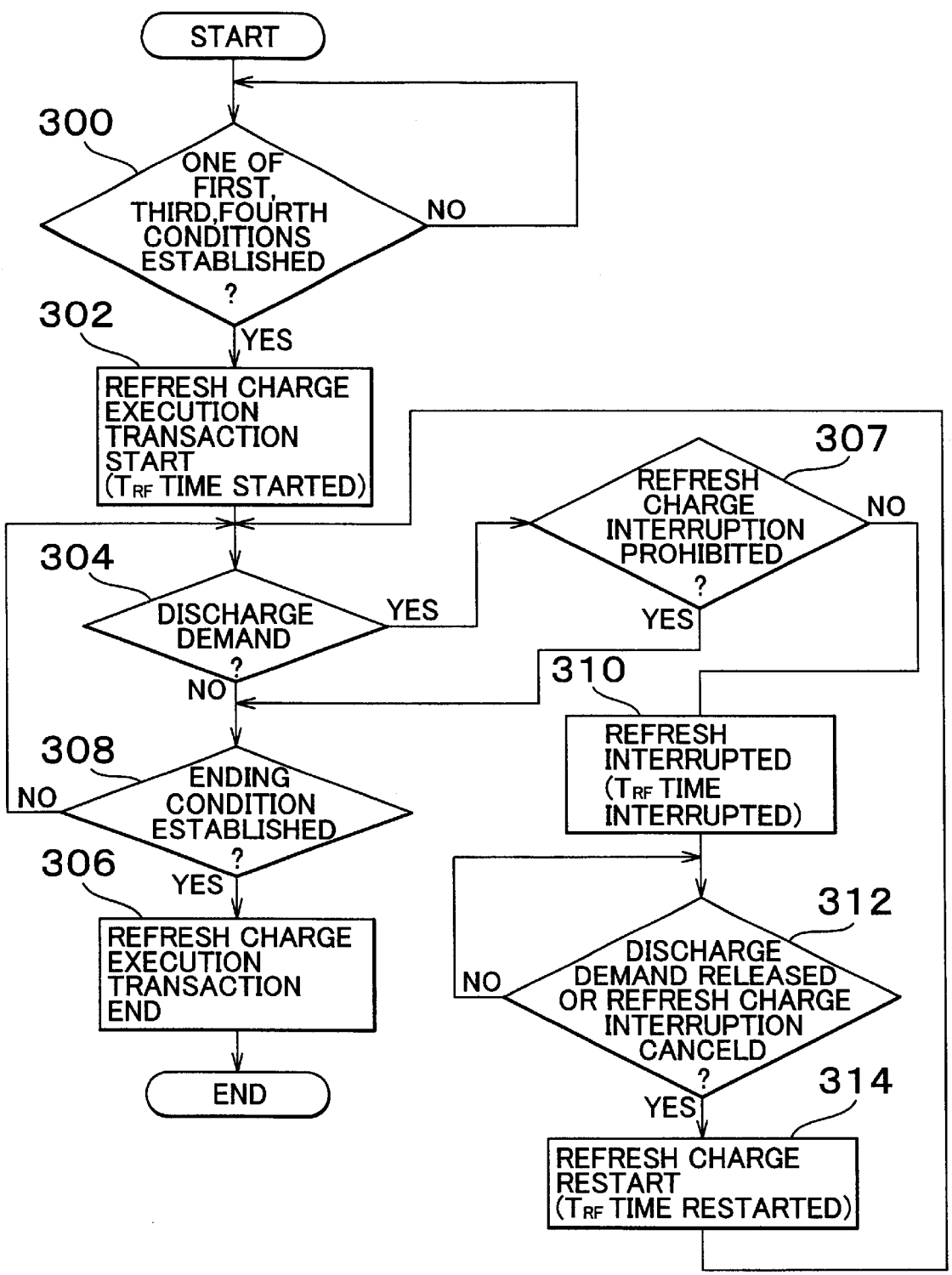
FIG. 4 is a flowchart of a control routine carried out for controlling the execution and the end of the refresh charge of the battery according to the first embodiment of the present invention.

FIG. 4 shows a flowchart of a control routine carried out after the ECU 16 establishes the starting condition (first through fourth conditions) of the refresh charge for controlling the execution and end of the refresh charge of the battery 10. The routine shown in FIG. 4 is activated repeatedly every time the transaction ends. When the routine shown in FIG. 4 is activated, a transaction of Step 300 is carried out.

In Step 300, it is judged whether either one of first, third, or fourth conditions is established. The transaction of Step 300 is repeatedly carried out until the positive judgment is performed. When the positive judgment is performed, the transaction of Step 302 is performed. In Step 302, the transaction for starting the refresh charge of the battery 10 is carried out. After the execution of the transaction of Step 302, the refresh charge of the battery 10 is performed to fully charge the battery 10. When the refresh charge is started in Step 302, the timing of an accumulative time (i.e., hereinafter referred as refresh time) $T_{RF}$ for performing the refresh charge is started. The refresh charge is performed in accordance with the accumulative time $T_{RF}$.

In Step 304, it is judged whether the discharge demand to the battery 10 is performed. When it is judged that the discharge demand is not performed, the transaction of Step 306 is carried out. On the other hand, when it is judged that the discharge demand is performed, the transaction of Step 307 is carried out.

In Step 307, it is judged whether it is under the condition for prohibiting the interruption of the refresh charge of the battery 10. Conditions for prohibiting the interruption of the refresh charge includes that the discharge of the battery 10 has been continued exceeding a predetermined time, that a discharge electric amount accumulative amount after starting the discharge of the battery 10 exceeds a predetermined amount, and that the refresh charge has not completed even when the trip number of the vehicle has exceeded a predetermined number of times. When it is judged that it is under the condition to prohibit the interruption of the refresh charge, a transaction of Step 306 is carried out.

In Step 306, it is judged whether the ending condition of the refresh charge is established. The ending condition of the refresh charge of Step 306 includes that the battery capacity SOC becomes approximately 100% and that the refresh time $T_{RF}$ has reached a time to the extend of being judged that the battery 10 is about to be the fully charged condition. When it is judged that the ending condition is not established, the transactions after Step 304 are carried out. On the other hand, when it is judged that the ending condition has been established, the transaction of Step 308 is carried out.

In Step 308, the transaction for ending the refresh charge of the battery 10 is carried out. After the transaction of Step 308 is carried out, the refresh charge of the battery 10 ends. When the transaction of Step 308 ends, the current routine ends.

In Step 307, when it is judged that it is under the condition to allow the interruption of the refresh charge, the transaction of Step 310 is carried out. In Step 310, the transaction for interrupting the started refresh charge is carried out. In this case, the timing of the refresh charge $T_{RF}$ is interrupted. After the transaction of Step 310 is carried out, the refresh charge is stopped to allow the discharge of the battery 10.

In Step 312, it is judged whether the discharge demand of the battery 10 has been canceled or whether it is under the condition to cancel the interruption of the refresh charge. Conditions for canceling the interruption of the refresh charge includes that the discharge of the battery 10 has been continued exceeding a predetermined amount and that the discharge electric amount accumulative amount after starting the discharge of the battery 10 exceeds a predetermined amount. The transaction of Step 312 is repeatedly carried out until the positive judgment is performed. When it is judged that the discharge demand has been released or when it is judged that it is under the condition to cancel the interruption of the refresh charge, the transaction of Step 314 is carried out.

In Step 314, the transaction for restarting the interrupted refresh charge is carried out. Simultaneously, the timing of the refresh time $T_{RF}$ is restarted. After the transaction of Step 314 is carried out, the refresh charge of the battery 10 is performed to fully charge the battery 10. When the transaction of Step 314 ends, the foregoing transactions after Step 304 are carried out.

According to the routine shown in FIG. 4, after restarting the refresh charge of the battery 10, the refresh charge is interrupted when the discharge demand is performed and the refresh charge can be restarted when the discharge demand is released. That is, the refresh charge can be stopped under the condition that the battery 10 is to be discharged. Thus, according to this embodiment, the battery 10 can be appropriately discharged even after starting the refresh charge and thus the operation of the electric load is securely ensured.

In this embodiment, the interruption of the refresh charge is not performed when it is under the condition to prohibit the interruption of the refresh charge even if the discharge demand is performed after the start of the refresh charge of the battery 10. And even when the discharge demand is not released under the condition that the refresh charge is interrupted, the refresh charge is restarted when it becomes the condition to cancel the interruption. Thus, according to this embodiment, it can be avoided that the refresh charge is hard to be performed due to the discharge demand of the battery 10 continued without limit and the condition that the refresh charge is not completed for long term can be avoided.

In the routine shown in FIG. 4, the timing of the refresh time $T_{RF}$ as the ending condition of the refresh charge is interrupted and restarted in accordance with the interruption and the restart of the refresh charge. That is, even when the refresh charge is interrupted, the charging time for performing the refresh charge is not reduced by the time of the interruption and the time same to the charging time without interruption is ensured. Thus, according to this embodiment, even if the refresh charge is interrupted due to the discharge of the battery 10, the effect of the refresh charge can be securely ensured.

According to the first embodiment of the present invention, the time T1 after achieving the fully charged condition by the last refresh charge of the battery 10 corresponds to a time for this invention. The accumulative value $\Sigma|I|$ of the discharge electric current I flowed in the battery 10 detected based on the output signal of the electric sensor 22 corresponds to an accumulative electric use amount of the present invention. The relationship (i)–(iv) shown in the first condition corresponds to a predetermined relationship of the present invention. $T_M$ corresponds to a first time of the present invention. $I_1-\alpha$ corresponds to a first use amount of the present invention. $T_M+1$ corresponds to a second time of the present invention. $I_1-\alpha-\beta$ corresponds to a second use amount of the present invention. The vehicle engine corresponds to a power source of the present invention.

According to the first embodiment of the present invention, a time count device of the present invention is realized by counting the time T1 after achieving the fully charged condition by the last refresh charge of the battery 10 by the ECU 16. An accumulative electric use amount count device of the present invention is realized by accumulating the absolute value of the battery electric current I detected based on the output signal of the electric sensor 22. A controller of the present invention is realized by carrying out the transactions of Step 100 and Step 102 of the routine shown in FIG. 2. A high-speed judging device of the present invention is realized by judging whether the vehicle speed SPD detected based on the output signal of the vehicle sensor 24 is equal to or faster than the predetermined vehicle speed SPD0. A time judging device of the present invention is realized by judging whether the condition that the vehicle speed SPD is equal to or faster than the predetermined vehicle speed SPD0 is continued for the predetermined time $T_{SH}$. An accumulative time electric use amount judging device of the preset invention is realized by judging whether the accumulative value $\Sigma|I|$ of the discharge electric current I detected based on the output signal of the electric sensor 22 is equal to or greater than 12.

According to the first embodiment of the present invention, the conditions shown in Step 206 or 208 of the routine shown in FIG. 3 correspond to a predetermined condition of the present invention. A charge accumulative time judging device of the present invention is realized by judging whether the refresh time $T_{RF}$ is equal to or longer than the time to the extent to judge that the battery 10 is about to be the fully charged condition by the ECU 16.

Although the lead acid battery is applied as the battery 10 in the first embodiment of the preset invention, the system using other batteries such as nickel hydride battery instead of the lead acid battery can be applied.

Although whether the vehicle is traveling equal to or faster than the predetermined vehicle speed is judged based on the output signal of the vehicle speed sensor 24 in the first embodiment, it is not limited to this manner according to this invention. For example, whether the vehicle is traveling equal to or faster than the predetermined vehicle speed may be judged by judging whether the vehicle is entered into a road on which the vehicle can perform high-speed traveling such as the expressway using a navigation device for detecting the position of the vehicle. In this case, a high-speed travel judging device and a time judging device of this invention can be realized by judging whether the vehicle is entered the expressway using the navigation device by the ECU 16.

Although the first condition and the second condition structure an OR condition for performing the refresh charge when either one of the first or second conditions is established according to the first embodiment of the present invention, the first and the second condition may structure an AND condition for performing the refresh charge by combining the contents of the first and the second conditions.

Further, although the refresh charge immediately ends when the condition shown in Step 206 or Step 208 of FIG. 3 is established according to the first embodiment, the refresh charge may end when the condition that the condition shown in Step 204 (i.e., SPD≦SPD0) is established has continued for the predetermined time. In this case, the refresh charge does not end immediately after the decrease of the vehicle speed. Thus, the charging time of the refresh charge can be ensured as long as possible and the completion of the refresh charge can be further easily achieved.

Figure 5:
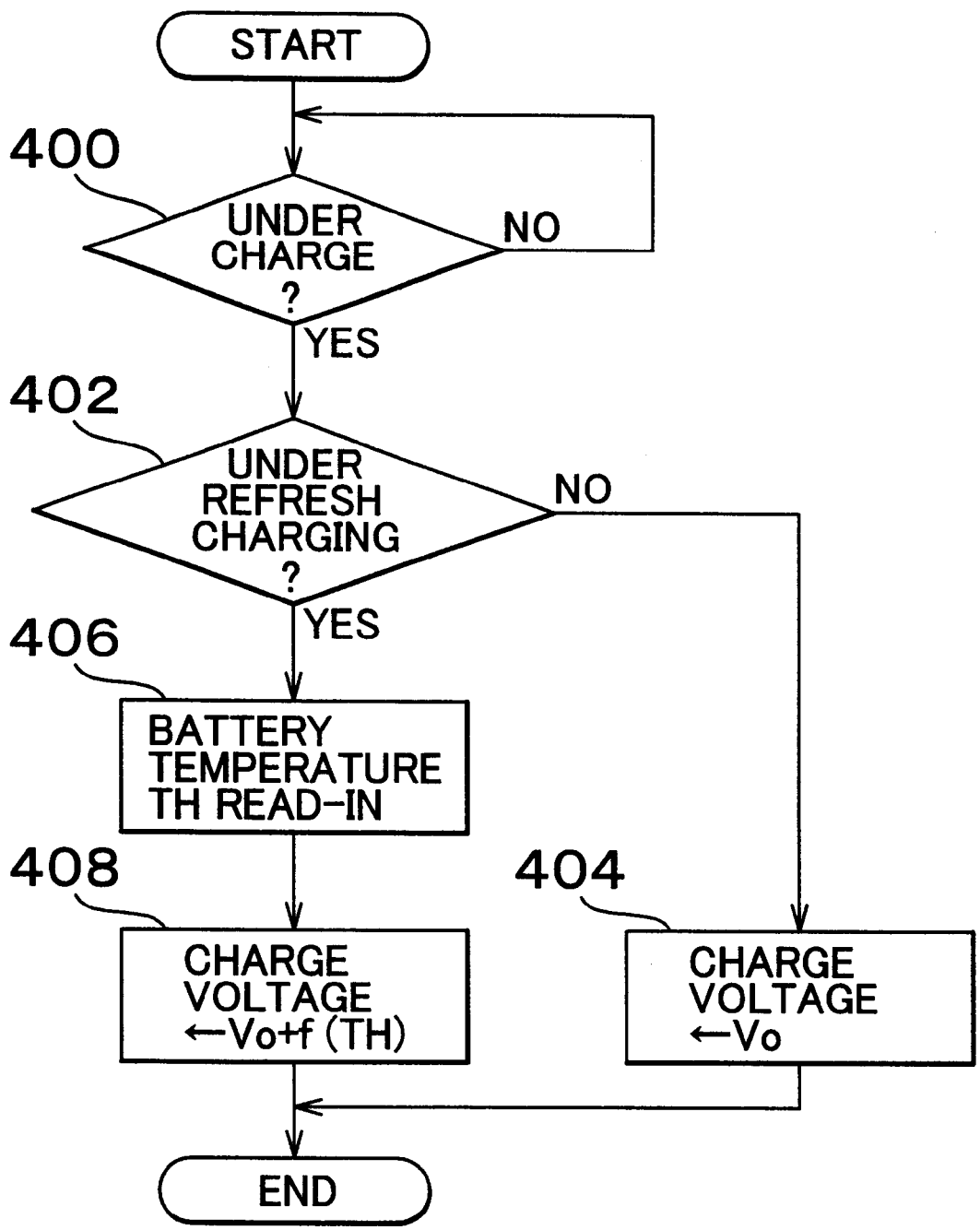
FIG. 5 is a flowchart of a control routine carried out for changing a charge voltage between the refresh charge of the battery and a normal charge according to a second embodiment of the present invention.

Referring to FIG. 1 and FIG. 5, a second embodiment of a system will be explained. The system of the second embodiment is realized by carrying out a routine shown in FIG. 5 by the ECU 16 with the construction shown in FIG. 1.

Provided that the electric voltage impressed from the inverter 12 to the battery 10 at the refresh charge of the battery 10 (i.e., hereinafter referred as the charge voltage) is the same level with the electric voltage at the normal charge by the regenerative braking, sizable charging time is required for completing the refresh charge for fully charging the battery 10 by the refresh charge. Thus, with the foregoing construction, the refresh charge may not be completed promptly and the effect of the refresh charge may not be ensured in short time.

Thus, according to the system of the second embodiment, the charge voltage impressed from the inverter 12 to the battery 10 is set to be at high-pressure side during the refresh charge compared to at the normal charge. With this construction, because the relatively large amount of the charging electric current is flowed in short time from the inverter 12 to the battery 10 at the refresh charge, the refresh charge can be completed promptly.

FIG. 5 shows a flow chart of a control routine carried out by the ECU 16 according to this embodiment in order to change the charging electric voltage between the refresh charge of the battery 10 and the normal charge of the battery 10. The routine shown in FIG. 5 is activated every time the transaction ends. When the routine shown in FIG. 5 is activated, the transaction of Step 400 is carried out.

In Step 400, whether the battery is under charging is judged based on the direction of the battery electric current I detected using the electric sensor 22 and the driving condition to the inverter 12. The transaction of Step 400 is repeatedly carried out until it is judged that the battery 10 is under the charging. Thus, when it is judged that the battery 10 is under the charging, the transaction of Step 402 is carried out.

In Step 402, it is judged whether the charging of the battery 10 is the refresh charge out of the refresh charge or the normal charge. When it is judged that the normal charge is performed, the transaction of Step 404 is carried out. When it is judged that the refresh charge is performed, the transaction of Step 406 is carried out.

In Step 404, the transaction for setting the charge voltage impressed from the inverter 12 to the battery 10 to be an electric voltage V0 as normal condition. The charge voltage V0 is set to a value in accordance with the battery temperature TH. After the transaction of Step 404 is carried out, the switching of the inverter 12 is operated to generate the charge voltage V0, thus, the battery 10 is charged using the charge voltage V0. When the transaction of Step 404 ends, the current routine ends.

In Step 406, the transaction for reading in the battery temperature TH based on the temperature sensor 26 is carried out. In Step 408, the transaction for setting the charge voltage impressed from the inverter 12 to the battery 10 as the addition of the electric voltage V0 at the normal charge and a value f(TH) in accordance with the battery temperature TH read-in in Step 406. The f(TH) is the positive value of the electric voltage by which it is judged that the charging of the battery 10 is promoted. The smaller the battery temperature TH is, the larger the f(TH) is determined. After the transaction of Step 408 is carried out, the switching of the inverter 12 is operated to generate the charging electric voltage V0+f(TH), and the battery 10 is charged using the charge voltage V0+f(TH) which has higher voltage compared to the normal charge voltage V0. When the transaction of Step 408 ends, the current routine ends.

According to the routine shown in FIG. 5, the charge voltage to the battery 10 can be set higher compared to the case performing the normal charge when the refresh charge of the battery 10 is performed. In this case, because the relatively large amount of the charge electric current is flowed to the battery 10 during the refresh charge, the refresh charge can be completed promptly.

When the charge voltage to the battery 10 is higher, the possibility for reaching the overcharge of the battery 10 becomes higher, and the deterioration of the battery 10 due to the overcharge is liable to be caused. Notwithstanding, because the frequency for carrying out the refresh charge is not so large, the deterioration of the battery 10 is hard to be caused even if the refresh charge is performed by impressing high electric voltage to the battery 10. Thus, according to the refresh charge control device of the second embodiment, the refresh charge can be promptly completed while restraining the deterioration of the battery 10 due to the overcharge to the minimum and the effect of the refresh charge can be ensured in short time.

The lower the temperature is, the harder for charging the battery 10, and the higher the temperature is, the easier charging the battery 10. Thus, provided that the charge voltage is maintained at constant voltage during the refresh charge irrespective of the battery temperature TH, the refresh charge of the battery 10 is not promoted when the battery temperature TH is low.

On the contrary, according to the second embodiment, the charge voltage impressed during the refresh charge of the battery 10 is changed in accordance with the battery temperature TH. In practice, the lower the battery temperature TH is, the higher the charge voltage is, and the higher the battery temperature TH, the lower the charge voltage. With this construction, because the charge electric current is easily flowed to the battery 10 during the refresh charge even if the battery temperature TH is low, the charging of the battery 10 is promoted. Thus, according to the refresh charge control device of the second embodiment, the effect of the refresh charge can be always realized in short time without being influenced by the battery temperature.

According to the second embodiment of the present invention, a charge voltage change device of this invention is realized by carrying out the transactions of Step 404 or Step 408 in the routine of FIG. 5 by the ECU 16.

Figure 6:
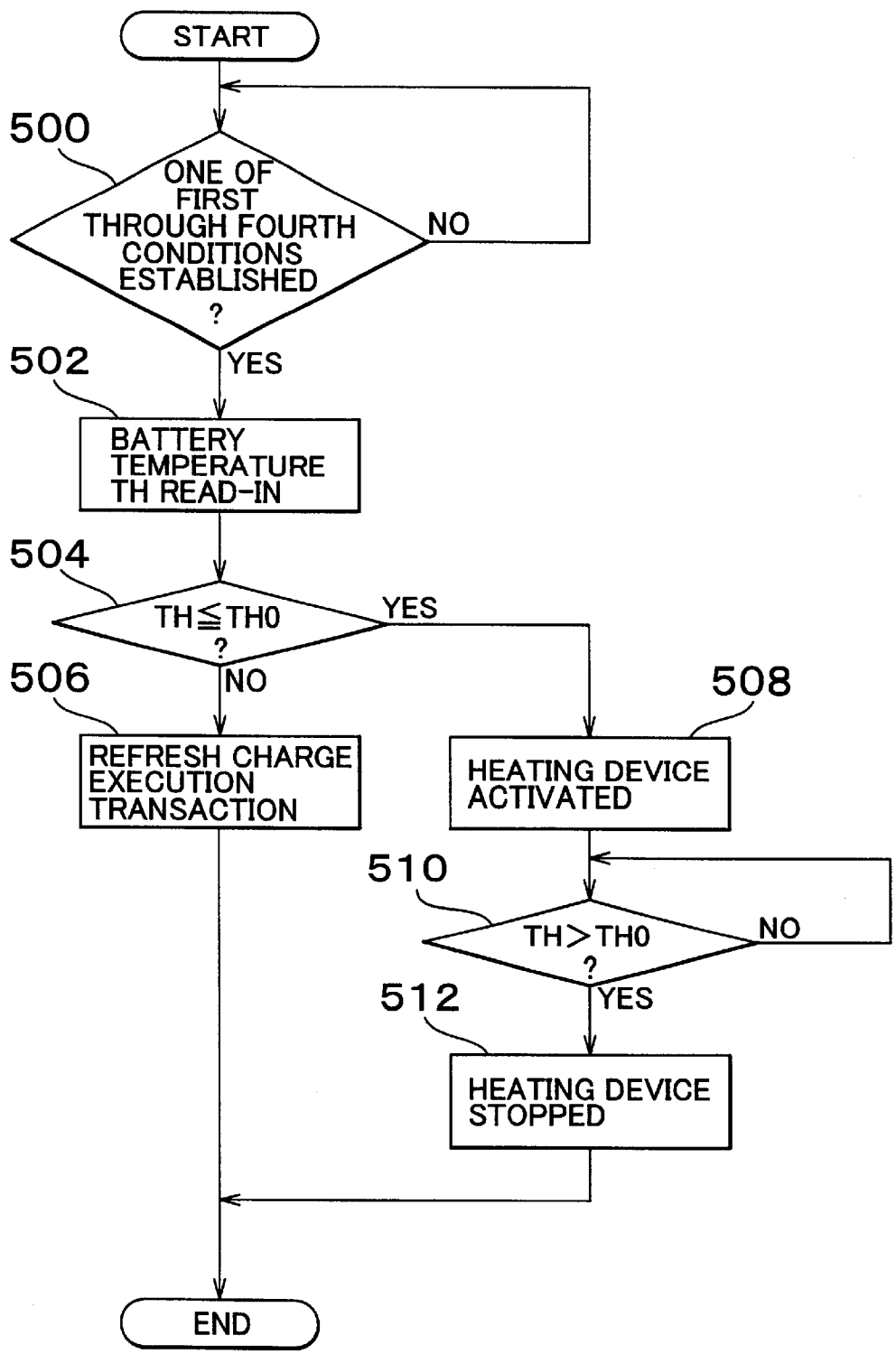
FIG. 6 is a flowchart of a control routine carried out for performing the refresh charge of the battery according to a third embodiment of the present invention.

Referring to FIGS. 1 and 6, a third embodiment of the present invention will be explained as follows. The system of the third embodiment is realized by carrying out a routine shown in FIG. 6 by the ECU 16 with the construction of FIG. 1.

As mentioned above, the battery 10 is hard to be charged when the temperature is lower and it is easier to charge the battery 10 when the temperature is higher. Thus, provided that the refresh charge is performed irrespective of the battery temperature TH, the refresh charge of the battery 10 is not promoted when the battery temperature TH is low.

Thus, according to the system of the third embodiment, the battery 10 is warmed up using a heating device 30 before performing the refresh charge of the battery 10 in case the battery 10 is at low temperature when performing the refresh charge of the battery 10. With this construction, because the temperature of the battery 10 is always increased to some extent when performing the refresh charge, the refresh charge of the battery 10 can be always performed effectively.

FIG. 6 shows a flowchart of a control routine carried out by the ECU 16 for performing the refresh charge of the battery 10 according to the third embodiment of the present invention. The routine shown in FIG. 6 is activated repeatedly every time the transaction ends. When the routine shown in FIG. 6 is activated, the transaction of Step 500 is carried out.

In Step 500, it is judged whether either one of first through fourth conditions is established. The transaction of Step 500 is repeatedly carried out until the positive judgment is performed. Thus, when the positive judgment is performed, that is, when it is judged that at least one of first through fourth conditions is established, the transaction of Step 502 is carried out. In Step 502, the transaction for reading in the battery temperature TH based on the temperature sensor 26 is carried out.

In Step 504, it is judged whether the battery temperature TH read-in in Step 502 is equal to or lower than a predetermined temperature TH0. The predetermined temperature TH0 is the maximum temperature that is judged that the charging of the battery 10 is not promoted during the charging of the battery 10. Thus, when it is judged that the battery temperature TH is equal to or lower than the predetermined temperature TH0 is not established, the transaction of Step 506 is carried out because it is judged that the battery 10 has relatively high temperature. On the other hand, when it is judged that the battery temperature TH is equal to or lower than the predetermined temperature TH0 is established, the transaction of Step 508 is carried out because it is judged that the battery 10 has at low temperature in which the charging of the battery 10 is not promoted.

In Step 506, the transaction for performing the refresh charge of the battery 10 is carried out. After carrying out the transaction of Step 506, the M/G 14 is operated as the generator by the increase of the engine output, the charge electric current is flowed to the battery 10 by the actuation of the inverter 12, and thus, the refresh charge is performed for fully charging the battery 10. In this case, the charge voltage to the battery 10 may be changed in accordance with the battery temperature TH as shown in the second embodiment. When the transaction of Step 506 ends, the current routine ends.

In Step 508, the transaction for activating the heating device 30 by supplying the command signal to the heating device 30 is carried out. After carrying out the transaction of Step 508, the heating device 30 starts the warm-up of the battery 10 by heating. In Step 510, it is judged whether the battery temperature TH exceeds the predetermined temperature TH0. The transaction of the Step 510 is repeatedly carried out until it is judged that the battery temperature TH is higher than the predetermined temperature TH0 is established. When it is judged that the battery temperature TH is higher than the predetermined temperature TH0 is established, the transaction of Step 512 is carried out to stop the warming-up of the battery 10 by the heating device 30. When the transaction of Step 512 ends, the current routine ends.

According to the routine shown in FIG. 6, the battery 10 can be warmed-up before starting the refresh charge of the battery 10 in case the temperature of the battery 10 is low enough not to promote the charging of the battery 10 when performing the refresh charge of the battery 10. Then, when the starting condition of the refresh charge is established and the battery 10 is warmed up, the refresh charge can be started. That is, according to the third embodiment of the present invention, the battery 10 is always warmed up to the temperature for not preventing the promotion of the charging when the refresh charge of the battery 10 is started.

Thus, according to the third embodiment, it can be avoided that the charging of the battery 10 is hard due to the low temperature during the refresh charge and the battery 10 can be always easily charged. Thus, according to the refresh charge control device of the third embodiment, the refresh charge can be always performed effectively and efficiently and the effect of the refresh charge can be ensured in short time because the refresh charge is performed after warming up the battery 10 in case the temperature of the battery 10 is low.

According to the third embodiment, a battery temperature judging device of the present invention is realized by carrying out the transaction of Step 504 in the routine of FIG. 6 by the ECU 16. A battery warm-up device of the present invention is realized by carrying out the transaction of Step 508 by the ECU 16. The heating device 30 of the third embodiment corresponds to a heating device of the present invention.

Although the battery 10 is warmed up before starting the refresh charge in case the temperature of the battery is low when performing the refresh charge of the battery 10 according to the third embodiment of the present invention, the warming up of the battery 10 may be preformed when the temperature of the battery 10 is low irrespective of the time when the refresh charge is performed.

Although the warming up of the battery 10 is performed by the heating device 30 according to the third embodiment, the present invention is not limited to the foregoing, and the battery 10 may be warmed up by repeating the charge and discharge of the battery 10 plural times.

What is claimed is:

1. A refresh charge control device comprising:
   a time count device that counts a time after achieving a last fully charged condition of a battery;
   an accumulative electricity use amount count device that counts an accumulative electricity use amount of the battery after achieving the last fully charged condition of the battery; and
   a controller that starts a refresh charge of the battery when the time counted by the time count device and the accumulative electricity use amount counted by the accumulative electricity use amount count device satisfy a predetermined relationship.

2. A refresh charge control device according to claim 1, wherein the controller starts the refresh charge of the battery when the time counted by the time count device is equal to or longer than a first time and the accumulative electricity use amount counted by the accumulative electricity use amount count device is equal to or greater than a first use amount.

3. A refresh charge control device according to claim 2, wherein the controller further starts the refresh charge of the battery when the time counted by the time count device is equal to or longer than a second time which is longer than the first time and the accumulative electricity use amount counted by the accumulative electricity use amount count device is equal to or greater than a second use amount which is less than the first use amount.

4. A refresh charge control device according to claim 1, wherein the controller interrupts the refresh charge when a discharge demand is performed after starting the refresh charge of the battery and restarts the refresh charge when the discharge demand is released.

5. A refresh charge control device according to claim 4, further comprising a charge accumulative time judging device that judges whether an accumulative time for performing the refresh charge after starting the refresh charge of the battery is equal to or longer than a predetermined time.
   wherein the controller ends the refresh charge when it is judged that the accumulative time is equal to or longer than the predetermined time by the charge accumulative time judging device after starting the refresh charge of the battery.

6. A refresh charge control device according to claim 1, further comprising a charge voltage change device that increases a charge voltage at the refresh charge of the battery compared to a charge voltage at a normal charge.

7. A refresh charge control device according to claim 6, wherein the charge voltage change device changes the charge voltage at the refresh charge of the battery in accordance with a temperature of the battery.

8. A refresh charge control device according to claim 1, further comprising:
   a battery temperature judging device that judges whether a temperature of the battery is equal to or less than a predetermined temperature; and
   a battery warm-up device that warms up the battery before starting the refresh charge when it is judged that the temperature of the battery is equal to or less than the predetermined temperature by the battery temperature judging device.

9. A refresh charge control device according to claim 8, wherein the battery warm-up device warms up the battery by operating a heating device that warms up the battery or by repeating charge and discharge of the battery.

10. A refresh charge control device for performing a refresh charge of a battery installed in a vehicle using a power source comprising:
    a high speed travel judging device that judges whether the vehicle is traveling equal to or faster than a predetermined vehicle speed; and
    a controller that performs the refresh charge of the battery when it is judged that the vehicle is traveling equal to or faster than the predetermined speed by the high-speed travel judging device.

11. A refresh charge control device according to claim 10, further comprising a time judging device that judges whether a condition judged that the vehicle is traveling equal to or faster than the predetermined vehicle speed judged by the high speed travel judging device continues for a predetermined time, wherein the controller starts the refresh charge of the battery when it is judged that the condition judged that the vehicle is traveling equal to or faster than the predetermined vehicle speed continues for the predetermined time by the time judging device.

12. A refresh charge control device according to claim 10, further comprising an accumulative electricity use amount judging device that judges whether an accumulative electricity use amount of the battery after achieving a last fully charged condition of the battery is equal to or greater than a predetermined amount, wherein the controller starts the refresh charge of the battery when it is judged that the accumulative electricity use amount is equal to or greater than the predetermined amount by the accumulative electricity use amount judging device.

13. A refresh charge control device according to claim 10, further comprising:

a time count device that counts a time after achieving a last fully charged condition of the battery; and an accumulative electricity use amount count device that counts an accumulative electricity use amount of the battery after achieving last fully charged condition of the battery; wherein the controller starts the refresh charge of the battery when the time counted by the time count device and the accumulative electricity use amount counted by the accumulative electricity use count device satisfies a predetermined relationship.

14. A refresh charge control device according to claim 10, wherein the controller continues the refresh charge until establishing a predetermined condition even when it is not judged that the vehicle travels equal to or faster than the predetermined vehicle speed by the high-speed travel judging device after starting the refresh charge of the battery.

15. A refresh charge control device according to claim 14, wherein the predetermined condition is that a discharge demand of the battery is performed.

16. A refresh charge control device According to claim 14, wherein the predetermined condition is that the vehicle travels equal to or slower than a vehicle speed which is less than the predetermined vehicle speed by a predetermined value.

17. A refresh charge control device according to claim 10, wherein the controller interrupts the refresh charge when a discharge demand is performed after starting the refresh charge of the battery and restarts the refresh charge when the discharge demand is released.

18. A refresh charge control device according to claim 17, further comprising a charge accumulative time judging device that judges whether an accumulative time for performing the refresh charge after starting the refresh charge of the battery is equal to or longer than a predetermined time.

wherein the controller ends the refresh charge when it is judged that the accumulative time is equal to or longer than the predetermined time by the charge accumulative time judging device after starting the refresh charge of the battery.

19. A refresh charge control device according to claim 10, further comprising a charge voltage change device that increases a charge voltage at the refresh charge of the battery compared to a charge voltage at a normal charge.

20. A refresh charge control device according to claim 19, wherein the charge voltage change device changes the charge voltage at the refresh charge of the battery in accordance with a temperature of the battery.

21. A refresh charge control device according to claim 10, further comprising:

a battery temperature judging device that judges whether a temperature of the battery is equal to or less than a predetermined temperature; and a battery warm-up device that warms up the battery before starting the refresh charge when it is judged that the temperature of the battery is equal to or less than the predetermined temperature by the battery temperature judging device.

22. A refresh charge control device according to claim 21, wherein the battery warm-up device warms up the battery by operating a heating device that warms up the battery or by repeating charge and discharge of the battery.

23. A refresh charge control method comprising:

counting a time after achieving a last fully charged condition of a battery;

counting an accumulative electricity use amount of the battery after achieving the last fully charged condition of the battery; and starting a refresh charge of the battery when the counted time and the counted accumulative electricity use amount satisfy a predetermined relationship.

24. A refresh charge control method for performing a refresh charge of a battery installed in a vehicle using a power source comprising:

judging whether the vehicle is traveling equal to or faster than a predetermined vehicle speed; and performing the refresh charge of the battery when it is judged that the vehicle is traveling equal to or faster than the predetermined speed.

* * * * *